US012090948B1

(12) United States Patent
Hwangbo et al.

(10) Patent No.: US 12,090,948 B1
(45) Date of Patent: Sep. 17, 2024

(54) AIRBAG DEVICE

(71) Applicant: HYUNDAI MOBIS CO., LTD., Seoul (KR)

(72) Inventors: Sang Won Hwangbo, Yongin-si (KR); Ji Woon Song, Yongin-si (KR); Byung Ho Min, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 18/363,053

(22) Filed: Aug. 1, 2023

(30) Foreign Application Priority Data

Mar. 14, 2023 (KR) ........................ 10-2023-0033419

(51) Int. Cl.
  *B60R 21/231* (2011.01)
  *B60R 21/207* (2006.01)
  *B60R 21/2165* (2011.01)
  *B60R 21/233* (2006.01)
  *B60R 21/2338* (2011.01)
  *B60R 21/2342* (2011.01)
  *B60R 21/237* (2006.01)
  *B60N 2/58* (2006.01)

(52) U.S. Cl.
  CPC .......... *B60R 21/233* (2013.01); *B60R 21/207* (2013.01); *B60R 21/2165* (2013.01); *B60R 21/231* (2013.01); *B60R 21/23138* (2013.01); *B60R 21/2338* (2013.01); *B60R 21/2342* (2013.01); *B60R 21/237* (2013.01); *B60N 2002/5808* (2013.01); *B60R 2021/23107* (2013.01); *B60R 2021/23146* (2013.01); *B60R 2021/23386* (2013.01)

(58) Field of Classification Search
  CPC B60R 2021/23146; B60R 2021/23386; B60R 2021/23107; B60R 2021/23308; B60R 21/23138; B60R 21/233; B60R 21/231; B60R 21/2165; B60R 21/2338; B60R 21/2342; B60R 21/207; B60N 2002/5808
  USPC .......... 280/730.2, 743.1, 743.2, 730.1, 728.2
  See application file for complete search history.

(56) References Cited

U.S. PATENT DOCUMENTS

| 8,777,257 | B2 | 7/2014 | Fukawatase et al. |
| 9,566,931 | B2* | 2/2017 | Keer .................... B60R 21/215 |
| 10,676,059 | B2 | 6/2020 | Minei et al. |
| 10,875,487 | B2* | 12/2020 | Kobayashi ............ B60R 21/207 |
| 2012/0068442 | A1* | 3/2012 | Wagner ................ B60R 21/207 |
| | | | 280/730.2 |

(Continued)

FOREIGN PATENT DOCUMENTS

JP   6432547 B2   12/2018
JP   2019-084945 A   6/2019

*Primary Examiner* — Keith J Frisby
(74) *Attorney, Agent, or Firm* — NovoTechIP International PLLC

(57) ABSTRACT

An airbag device includes a tether having an improved folding position that enables the tether to unfold as it cuts through a covering. The airbag device may include a foam pad embedded in a seatback, an airbag cushion folded at a lateral side of the foam pad and configured to be deployed forward, a covering shaped to cover the foam pad and configured to cover the seatback, and a tether positioned between the foam pad and the covering and connected between the seatback and the airbag cushion. The tether is configured to unfold as it cuts through the covering when the airbag cushion is deployed.

10 Claims, 6 Drawing Sheets

(56) References Cited

U.S. PATENT DOCUMENTS

| | | | |
|---|---|---|---|
| 2013/0187416 A1* | 7/2013 | Nakata | B60R 21/207 112/475.08 |
| 2016/0114751 A1* | 4/2016 | Saito | B60R 21/2176 297/216.13 |
| 2017/0259770 A1* | 9/2017 | Fujiwara | B60R 21/0134 |

* cited by examiner

AIRBAG DEVICE

CROSS-REFERENCE TO RELATED APPLICATIONS

The present application claims priority to Korean Patent Application No. 10-2023-0033419, filed on Mar. 14, 2023, the entire contents of which are incorporated herein for all purposes by this reference.

TECHNICAL FIELD

The present disclosure relates to an airbag device in which a folding position of a tether is improved so that the tether is unfolded while stably cutting a covering.

BACKGROUND

In the case of an omnidirectional airbag that is deployed in a shape that covers lateral sides and a front side of a passenger, a lateral chamber is connected to a front chamber to constitute an airbag cushion.

The airbag cushion is folded at left and right sides of a seat. In the event of a collision of a vehicle, the airbag cushion is deployed toward the front side of the passenger and surrounds the lateral sides and the front side of the passenger, thereby protecting the passenger.

However, when the lateral chamber and the front chamber are rotated outward and excessively separated while the airbag cushion is deployed, a space is defined forward of the passenger, which makes it difficult to safely restrain the passenger.

To solve the problem, a tether is connected to the lateral chamber and/or the front chamber, and an outward rotation of the chamber is restrained by the tether, thereby regulating a deployment shape of the airbag cushion.

However, in case that the tether cannot properly cut the seat, there occurs a problem in that the airbag cushion cannot be normally deployed.

The foregoing explained as the background is intended merely to aid in the understanding of the background of the present disclosure, and is not intended to mean that the present disclosure falls within the purview of the related art that is already known to those skilled in the art.

SUMMARY

The present disclosure is proposed to solve these problems and aims to provide an airbag device in which a folding position of a tether is improved so that the tether unfolds as it cuts through a covering.

To achieve the above-mentioned object, the present disclosure provides an airbag device including: a foam pad embedded in a seatback; an airbag cushion folded at a lateral side of the foam pad and configured to be deployed forward; a covering shaped to cover the foam pad and configured to cover the seatback; and a tether positioned between the foam pad and the covering and connected between the seatback and the airbag cushion, the tether being configured to unfold while cutting through the covering when the airbag cushion is deployed.

A slit, which has a shape opened forward, may be formed in a boundary portion between the airbag cushion and the foam pad, and the tether may pass through the slit when it unfolds. The slit may be formed in the foam pad.

A position regulation groove may be formed in a portion of the foam pad that faces the covering, and the tether may be positioned in the position regulation groove when folded.

The position regulation groove may be formed in a portion of the foam pad that adjoins the slit.

The tether may include an upper tether extending upward from an upper end of the airbag cushion along a rim of the seatback and connected to an upper end of a seatback frame.

The upper tether may be connected to an upper end of the seatback positioned relatively distant from the airbag cushion.

A tether tear line may be sewn to the covering along the tether, and the tether may unfold while cutting through the tether tear line.

The tether may include a lower tether extending downward from a lower end of the airbag cushion along a rim of the seatback and connected to a lower end of a seatback frame.

The airbag cushion may include a lateral chamber configured to be deployed in a shape that covers a lateral side of a seat, and a front chamber configured to be deployed in a shape that covers a front side of the seat, the upper tether may be connected to an upper end of the deployed front chamber and connected to an inner surface of the lateral chamber extending to the upper end of the front chamber, and the lower tether may be connected to a lower end of the deployed front chamber and connected to the inner surface of the lateral chamber extending to the lower end of the front chamber.

According to the present disclosure with the technical solutions, the middle portion of the tether extending between the airbag cushion and the seatback is positioned between the foam pad and the covering. Therefore, when the airbag cushion is deployed, the tether is unfolded while cutting through only the covering, such that a relatively high force is not required to deploy the tether. Therefore, the deployment performance of the tether is improved, and the airbag cushion is prevented from being abnormally deployed.

DETAILED DESCRIPTION

Figure 1:
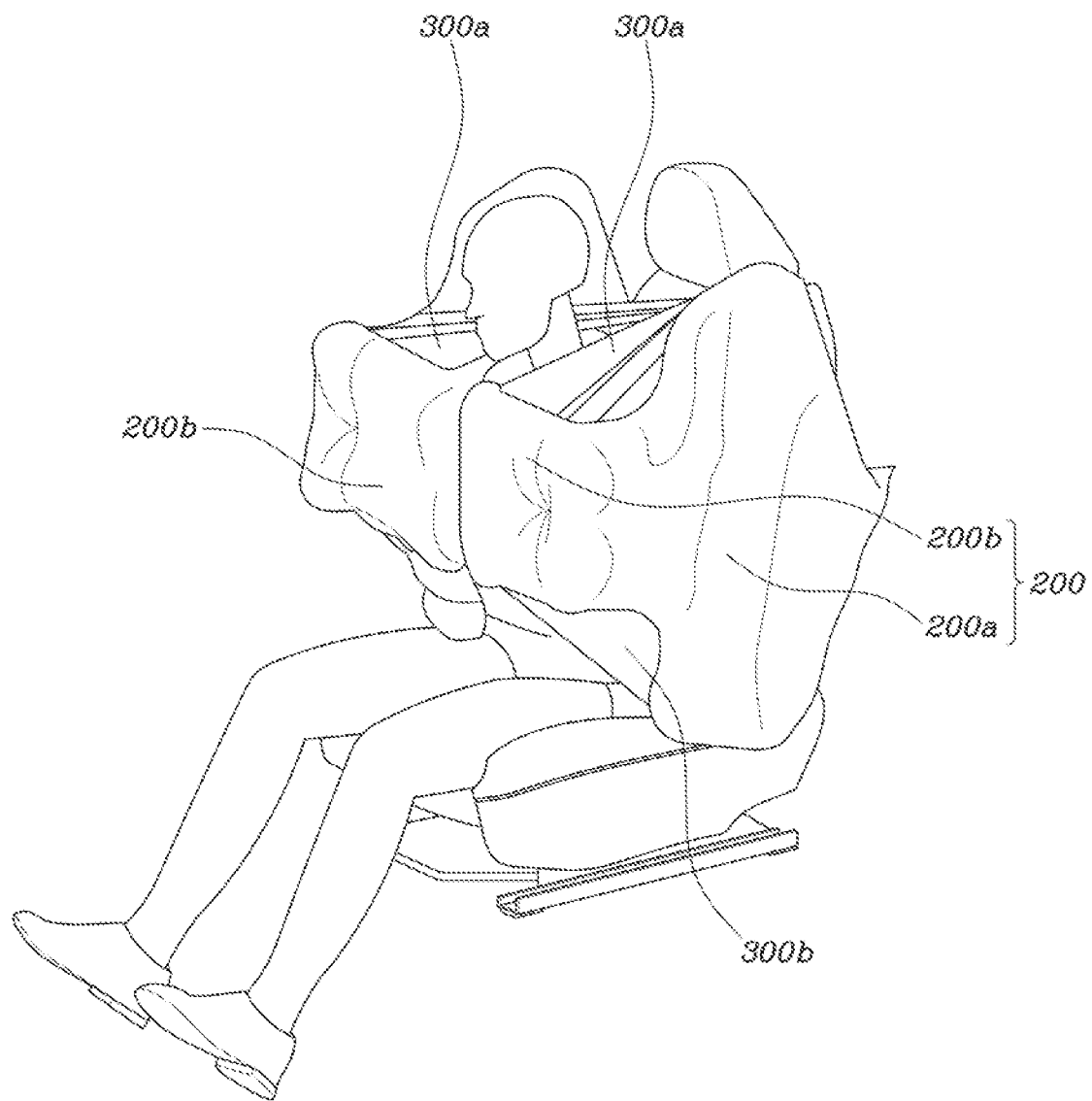
FIGS. 1 and 2 are views illustrating deployment shapes of an airbag cushion and a tether according to the present disclosure.

Hereinafter, embodiments disclosed in the present specification will be described in detail with reference to the accompanying drawings. The same or similar constituent elements are assigned with the same reference numerals regardless of reference numerals, and the repetitive description thereof will be omitted.

The suffixes 'module', 'unit', 'part', and 'portion' used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Hereinafter, exemplary embodiments of the present disclosure will be described in detail with reference to the accompanying drawings.

Figure 2:
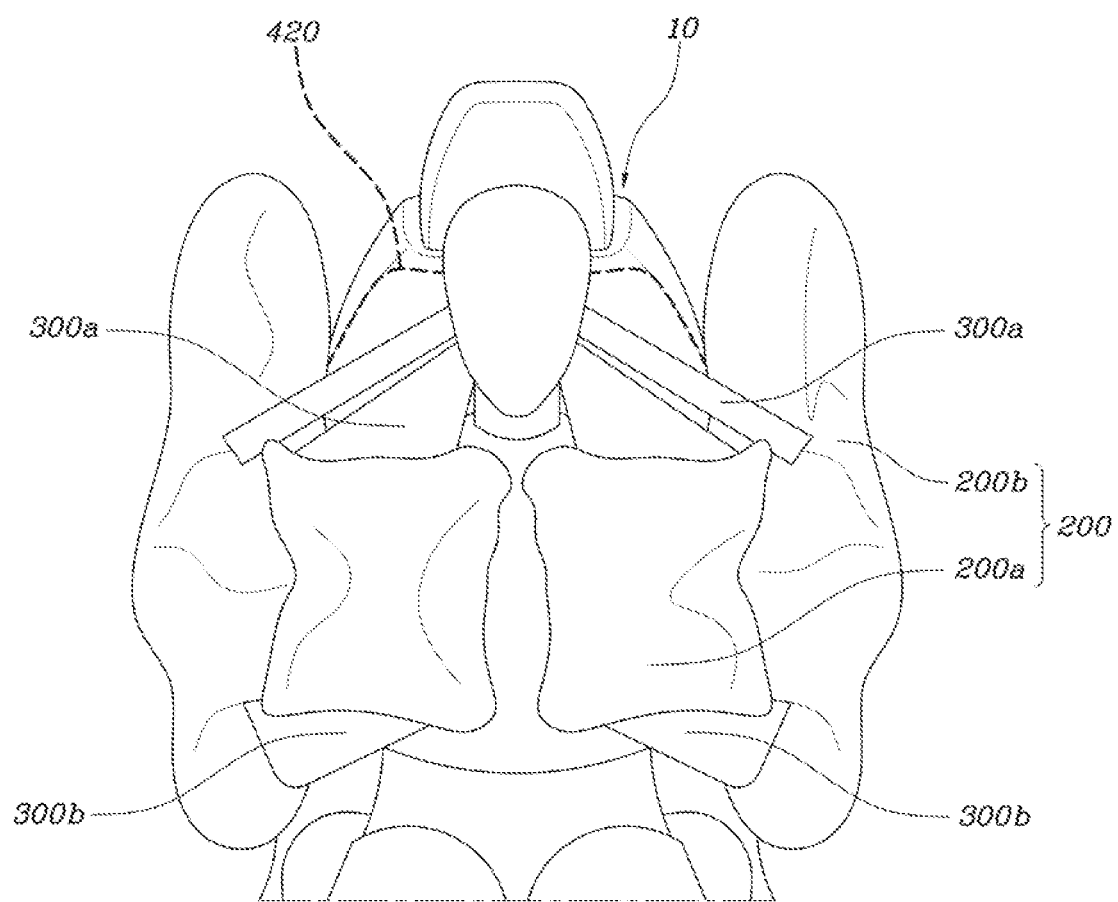

With reference to FIGS. 1 and 2, an airbag cushion 200 according to the present disclosure includes a lateral chamber 200a configured to be deployed in a shape that covers a lateral side of a seat, and a front chamber 200b configured to be deployed in a shape that covers a front side of the seat.

The lateral chamber 200a is deployed to be elongated in an upward/downward longitudinal direction while being deployed forward from a left or right side of a seatback 10.

The lateral chamber 200a is deployed to a space between a passenger and a vehicle structure such as a door and a center console and protects the passenger's head, shoulder, chest, abdomen, and pelvis that are main parts of the lateral side of the passenger.

The front chambers 200b are respectively connected to front ends of the lateral chambers 200a disposed at the left and right sides and configured to be deployed in shapes bent toward the front side of the passenger.

The front chamber 200b is deployed to protect a region from the passenger's shoulder to the passenger's abdomen.

That is, at the left and right sides of the seat, the lateral chambers 200a and the front chambers 200b are deployed in shapes that entirely surround the passenger's two opposite sides and the passenger's front side.

Therefore, the airbag directly restrains the passenger in accordance with various positions of the seat and various postures of the passenger, thereby safely protecting the passenger while coping with various collision modes. Therefore, the airbag may be substituted for a seat belt as well as airbags disposed at the other portions, thereby greatly improving marketability.

Meanwhile, according to the present disclosure, tethers 300, together with the airbag cushions 200, are embedded in the seatback 10. The tethers 300 are unfolded while cutting through the seatback 10 when the airbag is deployed, thereby regulating deployment shapes of the airbag cushions 200.

With reference to FIGS. 1 to 4, an airbag device of the present disclosure includes: a foam pad 100 embedded in the seatback 10; the airbag cushions 200 folded at lateral sides of the foam pad 100 and configured to be deployed forward; a covering 400 shaped to cover the foam pad 100 and configured to cover the seatback 10; and the tether 300 positioned between the foam pad 100 and the covering 400 and connected between the seatback 10 and the airbag cushion 200, the tether 300 being configured to be unfolded while cutting the covering 400 when the airbag cushion 200 is deployed.

Specifically, the foam pad 100 is embedded in the seatback 10 and implements a shape of the seatback 10.

Further, the airbag cushions 200 are folded at left and right positions of the foam pad 100, and the airbag cushion 200 may be assembled to left and right seatback frames 11.

Further, the seatback 10 is covered by the covering 400, such that the airbag cushions 200, together with the foam pad 100, are covered by the covering 400.

Further, one end of the tether 300 is fixed to the airbag cushion 200, and the other end of the tether 300 is fixed to an upper end of the seatback 10.

In particular, a middle portion of the tether 300, which extends between the airbag cushion 200 and the seatback 10, is positioned between the foam pad 100 and the covering 400. That is, the tether 300 is positioned on a rear surface of the covering 400, and the tether 300 passes through a part where the foam pad 100 and the covering 400 overlap each other.

That is, when the airbag cushion 200 is deployed, the tether 300 is unfolded while cutting only the covering 400, such that a relatively high force is not required to deploy the tether 300. Therefore, the deployment performance of the tether 300 may be improved, such that the airbag cushion 200 may be normally deployed.

Further, according to the present disclosure, a slit 110, which has a shape opened forward, is formed in a boundary portion between the airbag cushion 200 and the foam pad 100, and the tether 300 passes through the slit 110.

Figure 4:
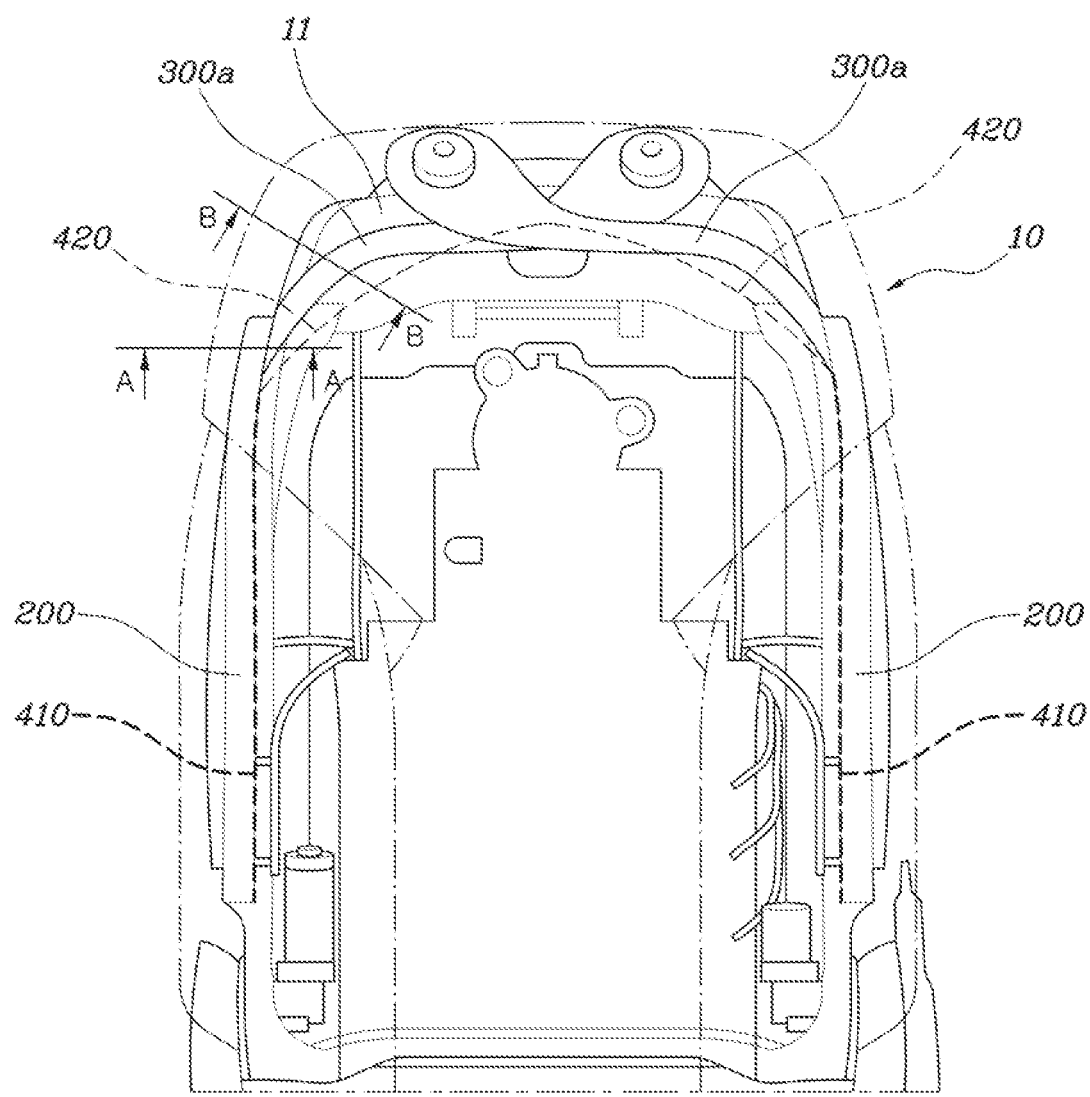
FIG. 4 is a view illustrating tear lines formed on a covering and illustrating the airbag cushion and the tether embedded in a seatback according to the present disclosure.
Figure 5:
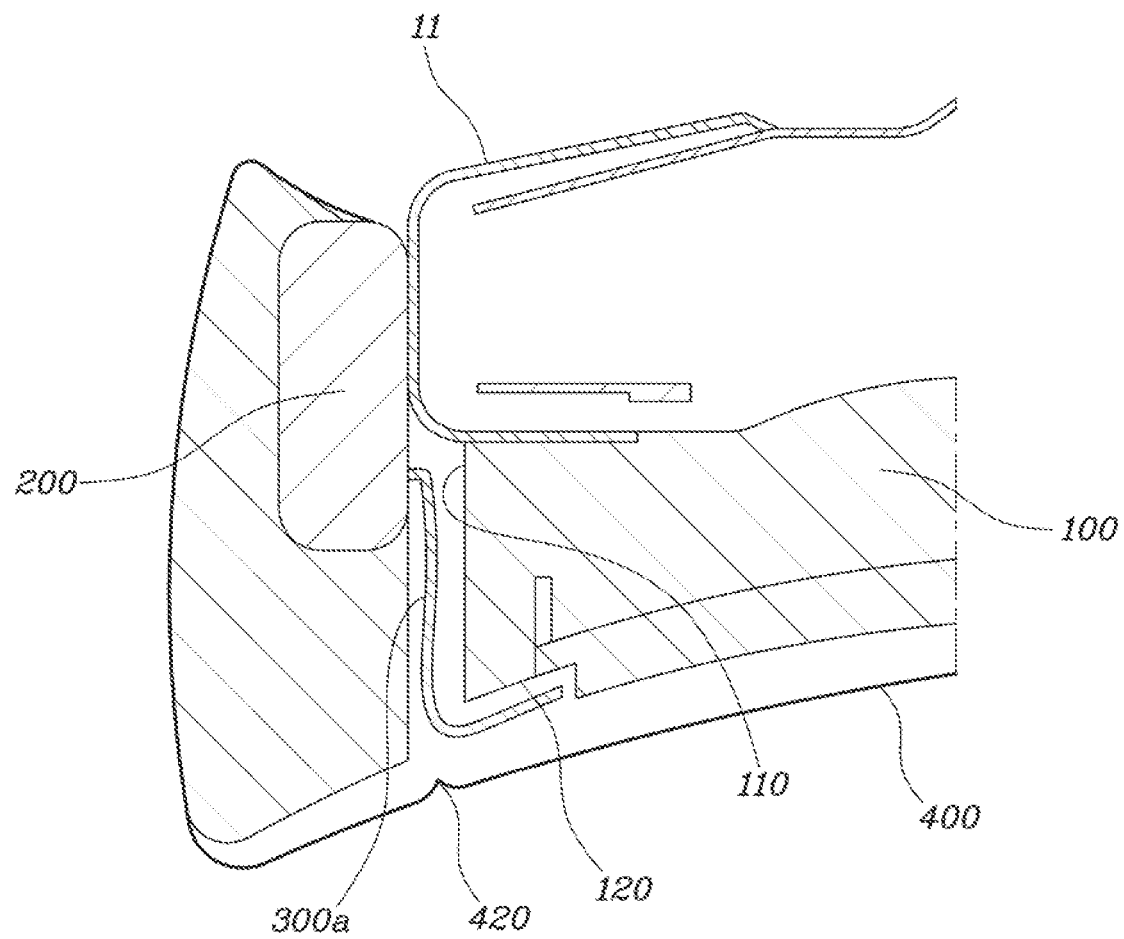
FIG. 5 is a cross-sectional view taken along line A-A in FIG. 4.

For example, as illustrated in FIGS. 4 and 5, the tether 300 fixed to the airbag cushion 200 adjoins the slit 110, such that the tether 300 is positioned in a form accommodated in the slit 110. Further, the tether 300 having passed through the slit 110 is positioned between the foam pad 100 and the covering 400.

In this case, the slit 110 may be formed in a groove shape opened forward, and a gap of the slit 110 in a width direction of the slit 110 may be formed to be at least larger than a thickness of the tether 300.

Therefore, the tether 300 positioned in the slit 110 is unfolded while being easily extended to a front side of the slit 110 while the airbag cushion 200 is deployed, such that the deployment performance of the tether 300 is improved, and the airbag cushion 200 is more stably deployed.

Further, the slit 110 may be formed in the foam pad 100.

For example, the slits 110 may be formed in a forward/rearward direction and disposed at the left and right sides of the foam pad 100. The slit 110 may be formed to an end of the rear surface of the foam pad 100. However, the slit 110 may be formed only to a predetermined depth in the foam pad 100 so that a thickness of the foam pad 100 at the portion of the slit 110 is smaller than a thickness of the foam pad 100 at the periphery, such that the function of the slit 110 may be implemented.

Further, according to the present disclosure, a position regulation groove 120 is formed in a portion of the foam pad 100 that faces the covering 400, such that the tether 300 may be positioned in the position regulation groove 120.

Figure 6:
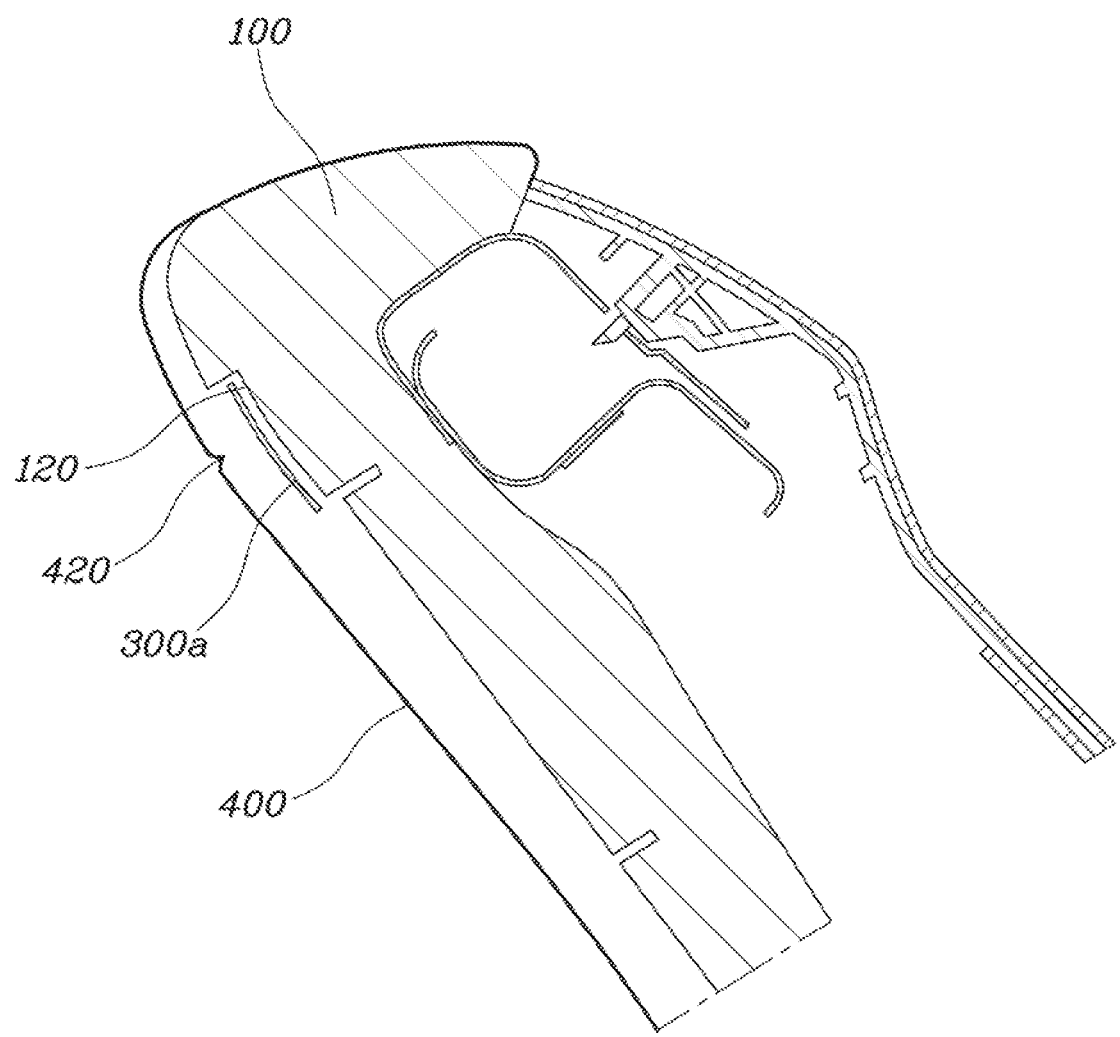
FIG. 6 is a cross-sectional view taken along line B-B in FIG. 4.

With reference to FIGS. 4 and 6, the position regulation groove 120, which is recessed concavely, is formed in the portion of the foam pad 100 that faces the covering 400 and allows the tether 300 to pass therethrough.

Therefore, the position of the tether 300 is regulated between the foam pad 100 and the covering 400, thereby improving assembling properties and workability of the tether 300.

In this case, the position regulation groove 120 may be formed in the foam pad 100 that adjoins the slit 110.

That is, the position regulation groove 120 extends to a front end of the slit 110, the tether 300 fixed to the airbag cushion 200 enters the position regulation groove 120 immediately after passing through the slit 110.

Therefore, the regulation of the position of the tether 300 is more easily and conveniently performed, such that assembling properties and workability of the tether 300 are further improved.

Meanwhile, in the present disclosure, the tethers 300 may include upper tethers 300a extending upwardly from upper ends of the airbag cushions 200 along a rim of the seatback 10 and connected to an upper end of the seatback frame 11.

Figure 3:
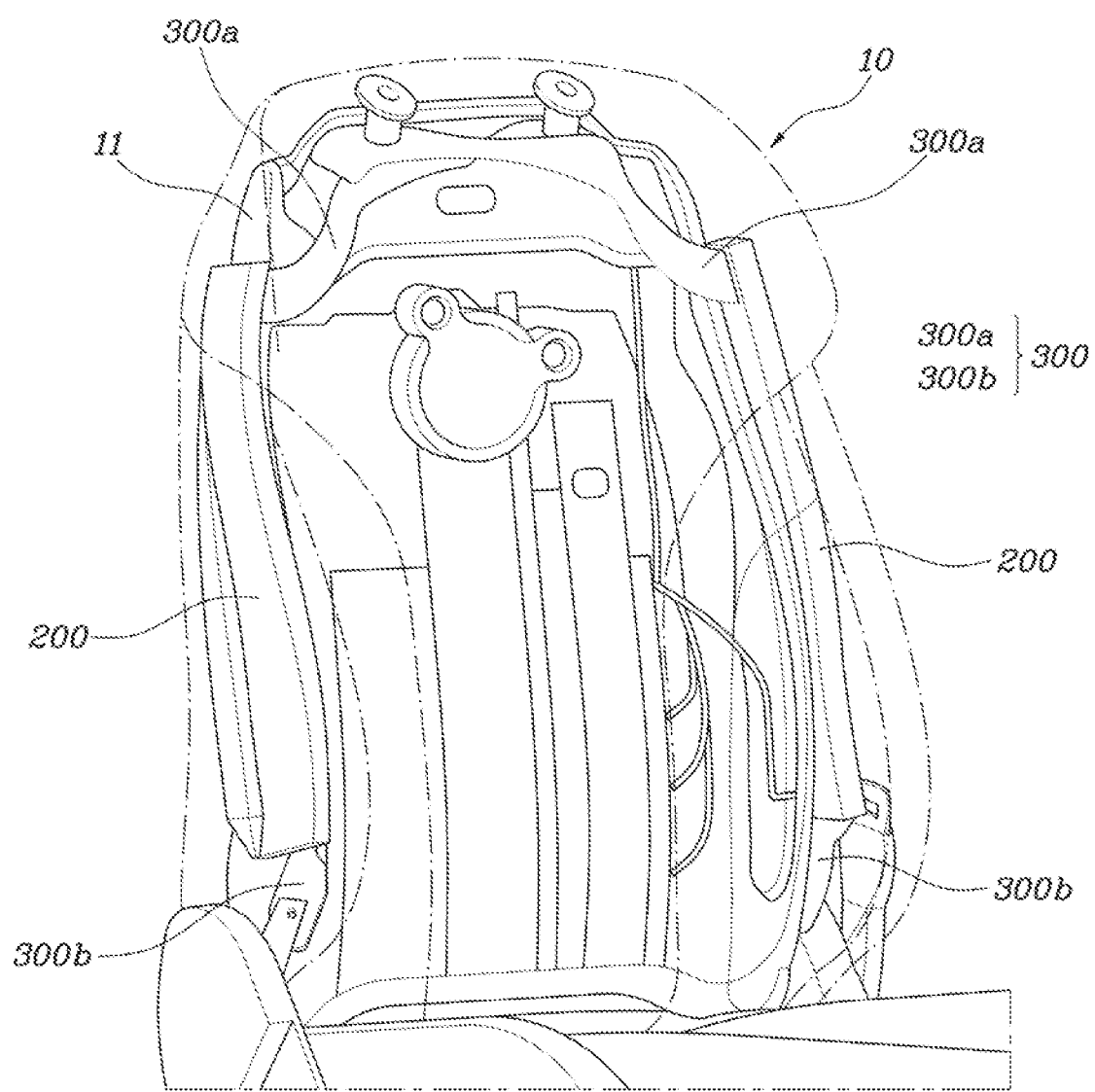
FIG. 3 is a view illustrating a shape made before the airbag cushion and the tether according to the present disclosure are deployed.

With reference to FIGS. 3 and 4, one end of the upper tether 300a is fixed to the upper end of the airbag cushion 200, and the other end of the upper tether 300a extends to the upper end of the seatback 10 and is fixed to the upper end of the seatback frame 11.

Specifically, one end of the upper tether 300a is fixed to an upper end of the front chamber 200b and fixed to an inner surface of the lateral chamber 200a extending to the upper end of the front chamber 200b, and the other end of the upper tether 300a is fixed at one point on the seatback frame 11, such that the upper tether 300a is deployed in a triangular surface shape.

Therefore, the upper tether 300a extends from the upper end of the seatback 10, passes over the passenger's shoulder, and is fixed to the airbag cushion 200 that covers the passenger's front and lateral sides, thereby regulating a deployment shape of an upper end of the airbag cushion 200.

Further, the upper tether 300a may be connected to the upper end of the seatback 10 positioned to be relatively distant from the airbag cushion 200.

For example, the upper tether 300a fixed to the upper end of the left airbag cushion 200 is fixed to a right side of the upper end of the seatback 10, and the upper tether 300a fixed to the upper end of the right airbag cushion 200 is fixed to a left side of the upper end of the seatback 10.

Therefore, a fixing point of the upper tether 300a fixed to the seatback 10 is distant from a fixing point of the upper tether 300a fixed to the airbag cushion 200, such that the airbag cushion 200 may be pulled by the upper tether 300a with a higher force, which more assuredly regulates the outward spread of the airbag cushions 200.

Further, a tether tear line 420 is sewn to the covering 400 along the tether 300, such that the tether 300 may be unfolded while cutting the tether tear line 420.

In this case, the tether tear line 420 may be formed by weakening a sewn line formed at the upper end of the seatback 10.

With reference to FIGS. 3 and 4, cushion tear lines 410 are formed in an upward/downward longitudinal direction at the left and right sides of the seatback 10, such that the airbag cushion 200 is deployed forward while cutting the cushion tear line 410.

Further, the tether tear line 420 extends to upper portions of the cushion tear lines 410, such that the tether 300 is unfolded while cutting the tether tear line 420.

In this case, the tether tear line 420 is formed while passing through the portion facing the slit 110.

Therefore, the airbag cushion 200 is deployed forward while cutting the cushion tear lines 410 of the covering 400 and the foam pad 100, and the upper tether 300a is deployed forward while cutting the tether tear line 420 of the covering 400, such that the airbag is normally and quickly deployed.

Meanwhile, in the present disclosure, the tethers 300 may include lower tethers 300b extending downwardly from lower ends of the airbag cushion 200 along the rim of the seatback 10 and connected to a lower end of the seatback frame 11.

Specifically, one end of the lower tether 300b is fixed to a lower end of the front chamber 200b and fixed to an inner surface of the lateral chamber 200a extending to the lower end of the front chamber 200b, and the other end of the lower tether 300b is fixed at one left or right point on the seatback frame 11, such that the lower tether 300b is deployed in a triangular surface shape.

Therefore, the lower tether 300b extends from the lower end of the seatback 10, passes over the passenger's thigh, and is fixed to the airbag cushion 200 that covers the passenger's front and lateral sides, thereby stably regulating a deployment shape of a lower end of the airbag cushion 200.

As described above, according to the present disclosure, the middle portion of the tether 300, which extends between the airbag cushion 200 and the seatback 10, is positioned between the foam pad 100 and the covering 400.

Therefore, when the airbag cushion 200 is deployed, the tether 300 is unfolded while cutting only the covering 400, such that a relatively high force is not required to deploy the tether 300. Therefore, the deployment performance of the tether 300 is improved, and the airbag cushion 200 is prevented from being abnormally deployed.

While the present disclosure has been described with reference to the specific examples, it is apparent to those skilled in the art that various modifications and alterations may be made within the technical spirit of the present disclosure, and these modifications and alterations belong to the appended claims.

What is claimed is:

1. An airbag device comprising:
  a foam pad embedded in a seatback;
  an airbag cushion folded at a lateral side of the foam pad and configured to be deployed forward;
  a covering shaped to cover the foam pad and configured to cover the seatback; and
  a tether positioned between the foam pad and the covering and connected between the seatback and the airbag cushion, the tether being configured to unfold while the covering tears when the airbag cushion is deployed.

2. The airbag device of claim 1, wherein a slit, which has a shape opened forward, is formed in a boundary portion between the airbag cushion and the foam pad, and
　　wherein the tether passes through the slit when the tether unfolds.

3. The airbag device of claim 2, wherein the slit is formed in the foam pad.

4. The airbag device of claim 2, wherein a position regulation groove is formed in a portion of the foam pad that faces the covering, and
　　wherein the tether is positioned in the position regulation groove when the tether is folded.

5. The airbag device of claim 4, wherein the position regulation groove is formed in a portion of the foam pad that adjoins the slit.

6. The airbag device of claim 1, wherein the tether comprises an upper tether extending upwardly from an upper end of the airbag cushion along a rim of the seatback, the upper tether being connected to an upper end of a seatback frame.

7. The airbag device of claim 6, wherein the upper tether is connected to the upper end of the seatback frame at a position that is spaced apart from the airbag cushion.

8. The airbag device of claim 6, wherein the tether comprises a lower tether extending downwardly from a lower end of the airbag cushion along the rim of the seatback and connected to a lower end of the seatback frame.

9. The airbag device of claim 8, wherein the airbag cushion includes (i) a lateral chamber shaped to cover a lateral side of a seat when the airbag cushion deploys, and (ii) a front chamber shaped to cover a front side of the seat when the airbag cushion deploys,
　　wherein the upper tether is connected to an upper end of the front chamber and to an inner surface of the lateral chamber extending to an upper end of the front chamber, and
　　wherein the lower tether is connected to a lower end of the front chamber and to the inner surface of the lateral chamber extending to a lower end of the front chamber.

10. The airbag device of claim 1, wherein a tether tear line is sewn into the covering along the tether, and
　　wherein the tether unfolds while the tether tear line tears when the airbag cushion is deployed.

\* \* \* \* \*